(12) United States Patent
Qtaishat et al.

(10) Patent No.: US 11,779,885 B2
(45) Date of Patent: Oct. 10, 2023

(54) SUPER-HYDROPHOBIC NANO-POROUS/MICRO-POROUS COMPOSITE MEMBRANES FOR MEMBRANE DISTILLATION OPERATING AT LOW INLET FEED TEMPERATURES WITH LOW ENERGY CONSUMPTION

(71) Applicants: SAUDI MEMBRANE DISTILLATION DESALINATION CO LTD., Thuwal (SA); Mohammed Rasool Qtaishat, Amman (JO); Takeshi Matsuura, Ottawa (CA)

(72) Inventors: Mohammed Rasool Qtaishat, Amman (JO); Takeshi Matsuura, Ottawa (CA); Areej Alsamhouri, Thuwal (SA); Noreddine Ghaffour, Thuwal (SA); Junggil Lee, Thuwal (SA)

(73) Assignee: SAUDI MEMBRANE DISTILLATION DESALINATION CO LTD., Thuwal (SA)

( * ) Notice: Subject to any disclaimer, the term of this patent is extended or adjusted under 35 U.S.C. 154(b) by 467 days.

(21) Appl. No.: 16/955,330

(22) PCT Filed: Dec. 18, 2018

(86) PCT No.: PCT/CA2018/051616
§ 371 (c)(1),
(2) Date: Jun. 18, 2020

(87) PCT Pub. No.: WO2019/119125
PCT Pub. Date: Jun. 27, 2019

(65) Prior Publication Data
US 2021/0001274 A1 Jan. 7, 2021

Related U.S. Application Data

(60) Provisional application No. 62/599,950, filed on Dec. 18, 2017.

(51) Int. Cl.
| | |
|---|---|
| *B01D 61/36* | (2006.01) |
| *B01D 3/10* | (2006.01) |
| *B01D 3/34* | (2006.01) |
| *B01D 69/12* | (2006.01) |
| *C02F 1/44* | (2023.01) |
| *B01D 3/14* | (2006.01) |
| *B01D 69/02* | (2006.01) |

(52) U.S. Cl.
CPC ............ *B01D 61/364* (2013.01); *B01D 3/10* (2013.01); *B01D 3/145* (2013.01); *B01D 3/346* (2013.01); *B01D 69/02* (2013.01); *B01D 69/12* (2013.01); *C02F 1/447* (2013.01); *B01D 2325/02* (2013.01); *B01D 2325/04* (2013.01); *B01D 2325/38* (2013.01)

(58) Field of Classification Search
CPC ........ B01D 61/364; B01D 3/10; B01D 3/346; B01D 69/12; C02F 1/447
See application file for complete search history.

(56) References Cited

U.S. PATENT DOCUMENTS

2007/0256969 A1 11/2007 Ding et al.
2016/0369076 A1 12/2016 Lee et al.

FOREIGN PATENT DOCUMENTS

CN 102179188 A 9/2011

OTHER PUBLICATIONS

Yasuhiro Miyauchi et al., Fabrication of a Silver-Ragwort-Leaf-Like Super-Hydrophobic Micro/Nanoporous Fibrous Mat Surface by Electrospinning, Nanotechnology 17, 2006, pp. 5151-5156.
Leonard D. Tijing et al. "Superhydrophobic Nanofiber Membrane Containing Carbon Nanotubes for High-Performance Direct Contact Membrane Distillation", Journal of Membrane Science 502, 2016, pp. 158-170.
Written Opinion for PCT/CA2018/051616, dated Mar. 14, 2019.
International Search Report for PCT/CA2018/051616, dated Mar. 14, 2019.

*Primary Examiner* — Sikarl A Witherspoon
(74) *Attorney, Agent, or Firm* — Sughrue Mion, PLLC

(57) ABSTRACT

A mathematical model was developed to lead to the design of a novel membrane, which can operate in membrane distillation at a small trans-membrane temperature gradient, including at low feed water temperature range. The novel membrane design can be described as a super-hydrophobic nano-porous/micro-porous composite membrane. This membrane will significantly decrease the energy requirements of the MD process since it can operate at very low inlet feed temperatures.

24 Claims, 6 Drawing Sheets

SUPER-HYDROPHOBIC NANO-POROUS/MICRO-POROUS COMPOSITE MEMBRANES FOR MEMBRANE DISTILLATION OPERATING AT LOW INLET FEED TEMPERATURES WITH LOW ENERGY CONSUMPTION

CROSS REFERENCE TO RELATED APPLICATIONS

This application is a National Stage of International Application No. PCT/CA2018/051616 filed Dec. 18, 2018, claiming priority based on U.S. Provisional Patent Application No. 62/599,950 filed Dec. 18, 2017.

FIELD OF THE INVENTION

The present invention pertains to the field of membranes for membrane distillation. More particularly, the present invention pertains to the field of super-hydrophobic nano-porous/micro-porous composite membranes used for different applications.

BACKGROUND OF THE INVENTION

Membrane distillation (MD) is an emerging physical separation technology, which has been attracting the researchers' attention in the last few decades. MD is a thermally driven process where a micro-porous membrane acts as a physical support separating a warm solution from a cooler chamber containing either a liquid or a gas. As the process is non-isothermal, vapour molecules migrate through the membrane pores from the high vapour pressure membrane side (i.e. warm membrane side) to the low vapour pressure membrane side. This can be established following different configurations, i.e. direct contact membrane distillation (DCMD); air gap membrane distillation (AGMD); sweeping gas membrane distillation (SGMD) and vacuum membrane distillation (VMD) [1]. Other configurations are also possible, such as water/material/conductive gap MD (WGMD/MGMD/CGMD) [2]. In all these configuration, flat sheet or follow fiber modules with different module configurations, e.g. spiral wound, in/out or out/in fibers, using different membrane materials are possible.

The main requirement of the MD membrane is that the pores must not be wetted and only vapour/gas is present. This is limiting the membrane distillation membranes choice into those made of hydrophobic materials such as polytetrafluoroethylene (PTFE), polypropylene (PP), and polyvinylidene fluoride (PVDF) [1]. Although these membranes were manufactured for microfiltration and ultrafiltration purposes, they have also been used in MD research due to their hydrophobic nature. Various hydrophobic membrane materials, including coating hydrophilic inorganic/polymeric membranes with hydrophobic materials including nanoparticles, graphene, MOF, CNTs etc, have also been used in MD research.

MD holds several advantages compared to other separation processes. These advantages, mainly, are: up to 100% rejection of non-volatile solutes, lower operating temperatures than conventional distillation processes, lower operating pressures than conventional pressure-driven membrane separation processes such as reverse osmosis (RO) and reduced vapour spaces compared to conventional distillation processes. Despite all these advantages, MD process has not been commercialized yet for large-scale plants. The main reasons are:

1) The relatively lower MD flux compared to other conventional desalination processes.
2) The membrane wetting, which diminishes the durability of MD membranes.
3) The energy requirements resulting from heating the feed side and cooling the permeate side or applying vacuum which is always needed to guarantee sufficient driving force for the MD operation. In other words, those are results of the inadequate design of the MD membranes.

There is therefore a need for MD membranes that can operate at low feed water temperatures, including at a small trans-membrane temperature gradient.

This background information is provided for the purpose of making the information believed by the applicants relevant to the present invention. No admission is necessarily intended, nor should be construed, that any of the preceding information constitutes prior art against the present invention.

SUMMARY OF THE INVENTION

An object of the present invention is to provide the detailed design of novel membrane that can be described as a super-hydrophobic nano-porous/micro-porous composite membrane for membrane distillation and related processes, which can operate at very low temperatures, including at low feed water temperature range; this will significantly decrease the energy requirements of the MD process.

In accordance with an aspect of the present invention, there is provided a composite membrane for use in a membrane distillation and related applications, the composite membrane comprising: a nano-porous super-hydrophobic active layer, and a micro-porous hydrophobic support layer, wherein the nano-porous super-hydrophobic active layer is coated on the micro-porous hydrophobic support layer.

In accordance with an aspect of the present invention, there is provided use of a membrane in accordance with the present invention in a membrane distillation process.

As a further aspect of the invention, there is provided a mathematical model that provides the theoretical basis for the new membrane design.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
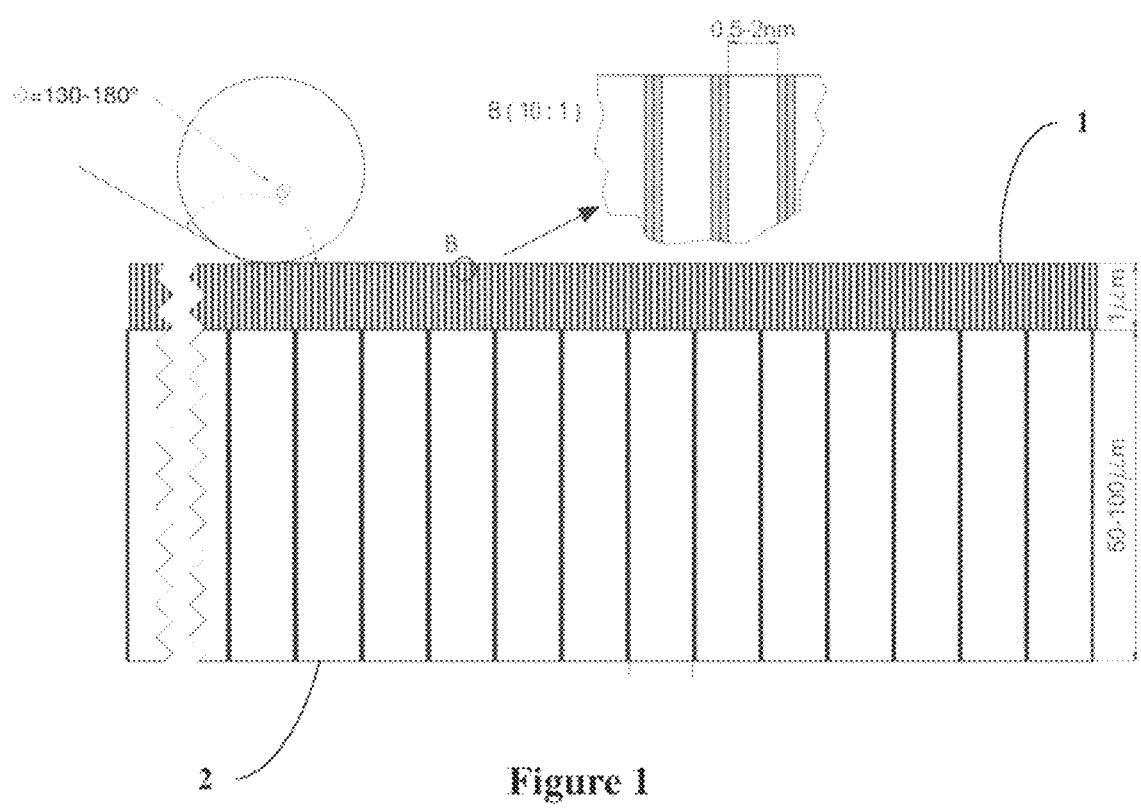
FIG. 1 is a schematic diagram of the super-hydrophobic nano-porous/micro-porous membrane structural characteristics.

Unless defined otherwise, all technical and scientific terms used herein have the same meaning as commonly understood by one of ordinary skill in the art to which this invention belongs.

As used in the specification and claims, the singular forms "a", "an" and the "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

The term "nano-porous membrane" is used herein to refer to membrane materials having pore sizes in the nanometer range.

The term "micro-porous membrane" is used herein to refer to membrane materials having pore sizes in the micrometer range.

The term "super-hydrophobic" is used herein to refer to materials with water contact angle in the range of at least about 130°. In a preferred embodiment, the contact angle of the super-hydrophobic active layer is from about 130° to about 180°.

Materials for the super-hydrophobic nano-porous membrane include homo- or block-copolymers whose contact angles are intrinsically in the specified range of 130 to 180°, or homo- or block-copolymers whose contact angles are lower than the specified range of contact angle but can be brought to the specified range by grafting of super-hydrophobic segments. Examples of polymers that can be hydrophobically modified to provide the required super-hydrophobic contact angle values include but are not limited to polyvinylidene fluoride (PVDF), polytetrafluoroethylene (PTFE), polyethylene (PE), polypropylene (PP), polydimethylsiloxane (PDMS) and poly (vinylidene fluoride-hexafluoropropylene) (PVDF-HFP). Suitable super-hydrophobic materials can also be provided by blends of these modified polymers or composite materials comprising these polymers and hydrophobic fillers including but not limited to activated carbons, carbon nanotubes, graphene, hydrophobic silica, or hydrophobic metal organic frameworks. The super-hydrophobic materials also include hydrophobic ceramic materials, including but not limited to titanium oxide and alumina grafted by perfluoroalkylsilane.

Materials for the micro-porous membranes include any polymers or ceramics from which membranes with micro-pores of specified sizes can be produced. In one embodiment, hydrophobic materials for the micro-porous membranes include but are not limited to polyvinylidene fluoride (PVDF), polytetrafluoroethylene (PTFE), polyethylene (PE), polypropylene (PP), polydimethylysiloxane (PDMS) and poly(vinylidene fluoride-hexafluoropropyl ene) (PVDF-HFP).

Preferably, the super-hydrophobic nano-porous/micro-porous composite membrane of the present invention has no wetting tendency, thereby providing MD membranes having improved durability.

The composite (bi-layer) membranes of the present invention comprise a nano-porous super-hydrophobic active layer coated on a micro-porous hydrophobic support layer.

FIG. 1 is a schematic diagram of the super-hydrophobic nano-porous/micro-porous membrane of the present invention, depicting active layer 1 and support layer 2. Also depicted are structural characteristics of the layers in accordance with preferred embodiments, including preferred pore size and thickness for each layer, as well as the active layer hydrophobicity and water contact angle $\Theta$. Proposed values of these parameters are presented in FIG. 1 only as an example; lower or higher values are also within the scope of the present invention.

The membranes of the present invention are particularly suitable for use in membrane distillation processes, including but not limited to direct contact membrane distillation (DCMD); air gap membrane distillation (AGMD); sweeping gas membrane distillation (SGMD) and vacuum membrane distillation (VMD). Other configurations are also possible, such as water/material/conductive gap MD (WGMD/MGMD/CGMD).

In accordance with the present invention, the composite membrane assures a vapor pressure difference (i.e., the driving force of MD) by the capillary effect, even at very low feed water temperatures, including at a small trans-membrane temperature differential, i.e. the inlet feed temperature is close to the permeate inlet temperature. In one embodiment, the trans-membrane temperature differential is 1° C. to 10° C.

Preferably, the super-hydrophobic nano-porous/micro-porous composite membranes can operate at low feed temperatures (e.g., 25-40° C.) for MD processes, or at a related ambient feed water temperature in the case of VMD configurations.

Also in accordance with the present invention, the composite membrane can also produce very high water vapor flux by the capillary effect even at very low feed water temperatures, including at a small trans-membrane temperature differential, i.e. the inlet feed temperature is close to the permeate inlet temperature, making membrane distillation a highly energy-efficient process.

In one embodiment, the nano-porous active layer has a pore size ranging from about 0.2 nm to about 10 nm. In a preferred embodiment, the active layer has a pore size in the range of 0.2 to 2 nm. In a further preferred embodiment, the active layer has a pore size of about 0.5 nm.

In one embodiment, the nano-porous super-hydrophobic active layer has a thickness in the range of 1 to 5 In a preferred embodiment, the active layer has a thickness of about 1 μm.

In one embodiment, the micro-porous support layer has a pore size ranging from about 0.1 μm to about 5 μm. In a preferred embodiment, the micro-porous support layer has a pore size ranging from about 0.1 μm to about 2 μm. In a further preferred embodiment, the micro-porous hydrophobic support layer has a pore size in the range of 1 μm.

In one embodiment, the micro-porous hydrophobic support layer has a thickness in the range of 50 to 100 μm. In a preferred embodiment, the support layer has a thickness of about 100 μm.

Theoretical Background of the New Membrane Design

The flux equation of MD is given by:

$$J_w = B_m(P_{f,m} - P_{p,m}) \quad (1)$$

where $B_m$ is the mass transfer coefficient, $P_{f,m}$ and $P_{p,m}$ are the vapour pressure in the feed and permeate side, respectively and their gradient is the driving force.

Analysing the Mass Transfer and Heat Transfer Coefficients:

Heat Transfer (i) Heat transferred across the boundaries of the feed side, $Q_f$:

$$Q_f = h_f(T_f - T_{f,m}) \quad (2)$$

where $h_f$ is the convection heat transfer coefficient of the bulk feed side, $T_f$ is the bulk feed temperature, and $T_{f,m}$ is the temperature of liquid/vapor interface at the feed side.

(ii) Heat transferred across the boundaries of the permeate side, $Q_p$:

$$Q_p = h_p(T_{p,m} - T_p) \quad (3)$$

where $h_p$ is the convection heat transfer coefficient of the bulk permeate side, $T_p$ is the bulk permeate temperature, and $T_{p,m}$ is the temperature of liquid/vapor interface at the permeate side.

(iii) Heat transferred through the membrane, $Q_m$:

$$Q_m = [\alpha J \Delta H + k_{overall}(T_{f,m} - T_{p,m})] \quad (4)$$

where J is the water vapour flux, $\Delta H$ is the thermal enthalpy for evaporation; $k_{overall}$ is the overall conductive heat transfer coefficient of the membrane and is given by:

$$k_{overall} = (k_{active}^{-1} + k_{support}^{-1})^{-1} \quad (5)$$

where $k_{active}$ and $k_{support}$ represent the active (nano-porous) layer and the support (micro-porous) layer conductive heat transfer coefficients, respectively and are defined as follows:

$$k_{actie} = \frac{k_{active}}{\delta_{active}} = \frac{\varepsilon_{active} k_{air} - (1 - \varepsilon_{active}) k_{active}}{\delta_{active}} \quad (6)$$

$$k_{support} = \frac{k_{support}}{\delta_{support}} = \frac{\varepsilon_{support} k_{air} - (1 - \varepsilon_{support}) k_{support}}{\delta_{support}} \quad (7)$$

where $\varepsilon_{active}$, $\varepsilon_{active}$, $\delta_{active}$ and $\delta_{support}$ represent the porosities and thicknesses of both the active and support layers respectively.

In Eq. (4), $\alpha$ is a correction factor for the flux reflecting the ratio between the driving force of flat surface to that of nano-pore surface (the capillary effect) which is given by:

$$\alpha = \frac{P_{f,m} - P_{p,m}}{P_{c,f,m} - P_{p,m}} \quad (8)$$

Further discussion regarding Equation (8) is shown in the driving force analysis.

At steady state, the heat transfer is equal:

$$Q = Q_f = Q_m = Q_p \quad (9)$$

Mass Transfer

Various types of mechanisms have been proposed for transport of gases or vapours through porous membranes: Knudsen model, viscous model, ordinary-diffusion model, and/or the combination thereof. The governing quantity that provides a guideline in determining which mechanism is operative under a given experimental condition is the Knudsen number, Kn, defined as the ratio of the mean free path ($\lambda$) of the transported molecules to the pore size (diameter, d) of the membrane; i.e. $Kn = \lambda/d$.

Due to the fact that in direct contact membrane distillation (DCMD) process both the hot feed and the cold permeate water are brought into contact with the membrane under atmospheric pressure, the total pressure is constant at $\approx 1$ atm resulting in negligible viscous flow.

In DCMD, mass transport across the membrane occurs in three regions depending on the pore size and the mean free path of the transferring species: Knudsen region, continuum region (or ordinary-diffusion region) and transition region (or combined Knudsen/ordinary-diffusion region). If the mean free path of transporting water molecules is large in relation with the membrane pore size (i.e. Kn>1 or r<0.5$\lambda$, where r is pore radius), the molecule-pore wall collisions are dominant over the molecule-molecule collisions and Knudsen type of flow will be the prevailing mechanism that describes the water vapour migration through the membrane pores. In this case, the net DCMD membrane permeability can be expressed as follows:

$$B_m^K = \frac{2}{3} \frac{\varepsilon r}{\tau \delta} \left( \frac{8M}{\pi RT} \right)^{1/2} \quad (10)$$

where $\varepsilon$, $\tau$, r, $\delta$ are the porosity, pore tortuosity, pore radius and thickness of the hydrophobic membrane, respectively; M is the molecular weight of water, R is the gas constant and T is the absolute temperature.

In DCMD processes, air is always entrapped within the membrane pores with pressure values close to the atmospheric pressure. Therefore, if Kn<0.01 (i.e. r>50$\lambda$), molecular diffusion is used to describe the mass transport in continuum region caused by the virtually stagnant air trapped within each membrane pore due to the low solubility of air in water. In this case the following relationship can be used for the net DCMD membrane permeability:

$$B_m^D = \frac{\varepsilon}{\tau \delta} \frac{PD}{P_a} \frac{M}{RT} \quad (11)$$

where $P_a$ is the air pressure, P is the total pressure inside the pore assumed constant and equal to the sum of the partial pressures of air and water, and D is the water diffusion coefficient. The value of PD (Pa·m²/s) for water-air was calculated from the following expression.

$$PD = 1.895 \; 10^{-5} T^{2.072} \quad (12)$$

Finally, in the transition region, 0.01<Kn<1 (i.e. 0.5$\lambda$<r<50$\lambda$), the molecules of water collide with each other and diffuse among the air molecules. In this case, the mass transport takes place via the combined Knudsen/ordinary-diffusion mechanism and the following equation is used to determine the water liquid permeability.

$$B_m^C = \left[ \frac{3}{2} \frac{\tau \delta}{Er} \left( \frac{\pi RT}{8M} \right)^{1/2} + \frac{\tau \delta}{\varepsilon} \frac{P_a}{PD} \frac{RT}{M} \right]^{-1} \quad (13)$$

Analyzing the Driving Force:

According to the following Kelvin equation, the vapour pressure in a capillary with a radius of r, $p_{s,r}$ is different from the flat surface, $p_s$:

$$\frac{p_{s,r}}{p_s} = \exp\left( -\frac{2\sigma V_m \cos\theta}{rRT} \right) \quad (14)$$

where $\sigma$ is the surface tension, $V_m$ is the molar volume, $\theta$ is the contact angle, R is the ideal gas constant and T is the absolute temperature.

Those physical properties are function of temperature; Table 1 shows their values at two different temperatures.

TABLE 1 water physical properties at 40° C. and 80° C.

| Temperature, ° C. | 40° C. | 80° C. |
|---|---|---|
| $\sigma$, N/m | $6.96 \times 10^{-2}$ | $6.26 \times 10^{-2}$ |
| $\rho$, kg/m$^3$ | 992.2 | 971.8 |
| M, kg/kmol | 18.02 | 18.02 |
| R, J/kmol K | $8.314 \times 10^3$ | $8.314 \times 10^3$ |
| T, K | 313.2 | 353.2 |
| $p_s$, Pa | $0.0728 \times 10^5$ | $0.4672 \times 10^5$ |
| $V_m = M/\rho$, m$^3$/kmol | 0.01815 | 0.01854 |

Using the data for 40° C. for an extremely hydrophobic membrane (i.e. $\theta=180°$):

$$-\frac{2\sigma V_m \cos\theta}{RT} = \frac{(2)(6.96\times 10^{-2})(0.01815)}{(8.314\times 10^3)(313.2)} = 0.9702 \times 10^{-9}$$

Then, for $r=10^{-9}$ m (1 nm), $p_{s,r}/p_s=2.638$
$p_{s,r}=(2.638)(0.0728\times10^5)=0.1920\times10^5$ Pa, which is almost equivalent to a vapour pressure of 59° C.

When $r=0.5\times10^{-9}$ m (0.5 nm), $p_{s,r}/p_s=6.962$
$p_{s,r}=(6.962)(0.0728\times10^5)=0.5068\times10^5$ Pa, which is almost equivalent to a vapour pressure of 81° C.

On the other hand, when $r=10^{-6}$ m (1 µM), $p_{s,r}/p_s=1.001$, and there is practically no change in vapour pressure from the flat surface.

This means that, when laminating two hydrophobic membranes of different pore sizes, a driving force for vapour flux can be generated even when the temperature is maintained nearly equal on both sides of the membrane.

If the smaller pore size is 1 nm, then the temperature difference will be about 20° C. If the smaller pore size is 0.5 nm the temperature difference will be 40° C. Therefore, heating of feed solution from 20 to 40° C. will not be required. FIG. 1 is a schematic depiction of one embodiment of a super-hydrophobic nano-porous/micro-porous composite membrane having a pore size, thickness and the contact angle of the dual layered super-hydrophobic nano-porous/micro-porous membrane that will achieve the driving force generation with a very small temperature gradient, even at low feed water temperature range.

Using the data for 80° C. from Table 1:

$$-\frac{2\sigma V_m \cos\theta}{RT} = \frac{(2)(6.26\times 10^{-2})(0.01854)}{(8.314\times 10^3)(353.2)} = 0.7905 \times 10^{-9}$$

when $r=10^{-9}$ m (1 nm), =2.204
$p_{s,r}=(2.204)(0.4672\times10^5)=1.030\times10^5$ Pa, which is equivalent to a vapour pressure of 100° C. (boiling point).

In summary, it can be concluded that MD can be operated even when there is very small temperature difference between the feed and permeate sides, including at low feed water temperature range, using the composite membranes of the present invention. This enables the MD to operate at the lowest possible supplied heat to the system.

The Predicted Flux Equation

Considering the mass transfer coefficient and the driving force analysis shown earlier, one can derive the flux equation by applying the resistance analogy as follows:

The mass transfer coefficient is the reciprocal of the total resistance:

$$B_m = \frac{1}{R_1 + R_2} \quad (15)$$

where $R_1$ and $R_2$ represents the resistances in the super-hydrophobic nano-porous and the hydrophobic micro-porous layers, respectively.

By performing the mean free bath calculations, it was found that Knudsen mechanism is the prevailing mechanism in the nano-porous layer, while the molecular diffusion mechanism is dominating the micro-porous layer. As a result, Eq. 15 can be rewritten as:

$$B_m = \frac{1}{\frac{1}{B_m^K} + \frac{1}{B_m^D}} \quad (16)$$

Now, substituting Eqs. 10 and 11 into Eq. 16, gives:

$$B_m = \frac{1}{\left(\frac{3\tau_1 \delta_1}{2\varepsilon_1 r_1}\right)\left(\frac{8M}{\pi RT}\right)^{-1/2} + \left(\frac{\tau_2 \delta_2 P_a RT}{\varepsilon_2 PDM}\right)} \quad (17)$$

Consequently, the flux equation can be expressed as:

$$J_w = \frac{P_f - P_p}{\left(\frac{3\tau_1 \delta_1}{2\varepsilon_1 r_1}\right)\left(\frac{8M}{\pi RT}\right)^{-1/2} + \left(\frac{\tau_2 \delta_2 P_a RT}{\varepsilon_2 PDM}\right)} \quad (18)$$

It is worth noting that the numerator is the driving force, which depends on the membrane pore size as discussed earlier.

Example 1: Parametric Study of the Proposed Design

In the following example, a detailed parametric study of the proposed nano-porous/micro-porous composite membrane design is thoroughly investigated in order to discuss the effect of the different membrane parameters on its performance in the MD process. The module used in this example is flat sheet type with dimensions of 0.1 m×0.05 m×0.003 m (length×width×height).

The membrane active layer has a pore size of 1 nm, porosity of 0.8, tortuosity of 1.2, and a thickness of 1 µm. The membrane support layer has a pore size, porosity, tortuosity, and thickness of 1 µm, 0.8, 1.2, and 50 µm, respectively. The thermal conductivities of the membrane and air are 0.25 W/m$^2$K and 0.026 W/m$^2$K, respectively.

Results and Discussion of the Mathematical Model Outputs

The effects of modifying various physical parameters of the two membrane layers on the performance of a composite membrane developed in accordance with the principles of the present invention are described below and in FIGS. 2 to 6. These are based on a composite membrane formed from a nano-porous super-hydrophobic active layer coated on a micro-porous hydrophobic support layer.

1. Influence of the Active Layer Pore Size on the Membrane Performance

In this example, the active layer has a porosity, tortuosity and thickness of 0.8, 1.2 and 1 µm, respectively, and the support layer has a pore size, porosity, tortuosity and thickness of 1 µm, 0.8, 1.2, and 50 µm, respectively.

Figure 2:
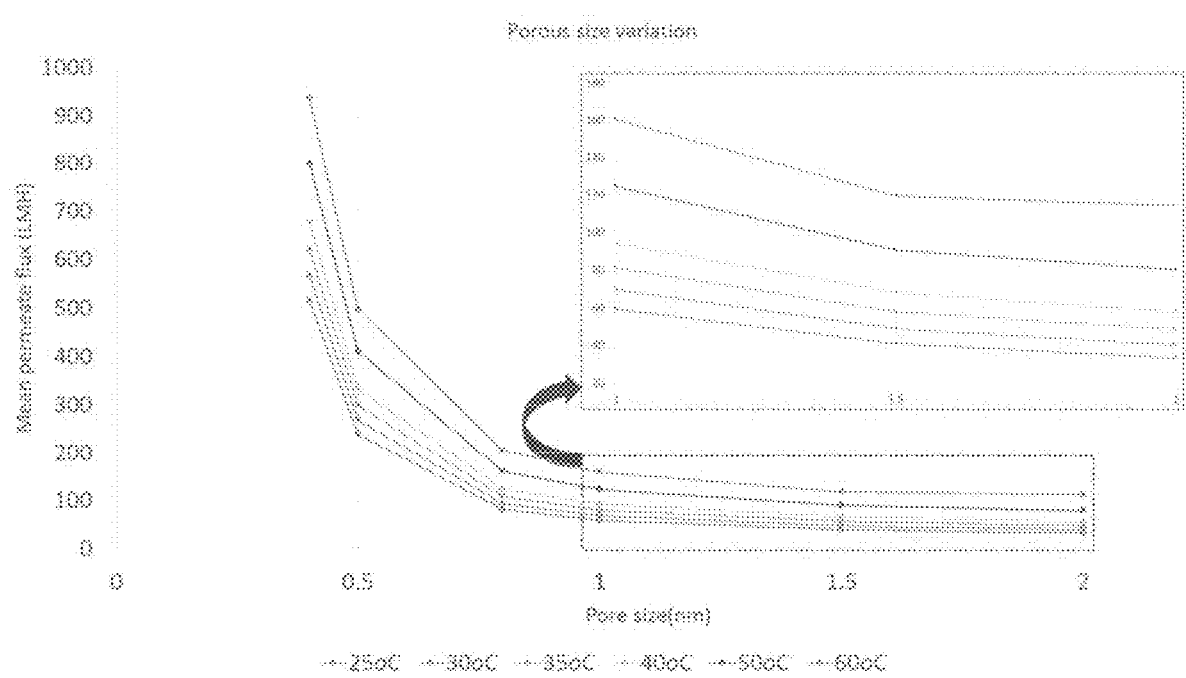
FIG. 2 shows the effect of active layer pore size on the permeate flux at various inlet feed temperatures, and inlet permeate temperature of 20° C., and inlet feed and permeate flow rates of 0.4 L/min.

As shown in FIG. 2, when an active membrane pore size of 0.4 nm was used, the maximum mean permeate flux was as high as 937.42 LMH (L/h·m$^2$) at inlet feed and permeate temperatures of 60° C. and 20° C., respectively, and inlet feed and permeate flow rates of 0.4 L/min, which is 10-20 times higher flux compared to typical MD membranes (such as those membranes made of polytetrafluoroethylene, polyvinylidene fluoride and polypropylene with pore size of 0.2 µm and 0.45 µm [3]) operating under the same conditions. Furthermore, the permeate flux decreased with an increase in the pore size of active layer from 0.4 nm to 2 nm, which can be attributed to the fact that increasing the pore size will decrease the vapour pressure increase due to the capillary effect as shown in Kelvin's equation (Eq. 14), which decreases the driving force of the process, resulting in the permeate flux decrease. The same trend was found for all applied feed temperatures.

Nevertheless, it is noticeable that a quite high permeate flux (about 60 LMH with active layer pore size of 1 nm) is obtained with a very low inlet feed temperature (25° C.), close to the inlet permeate temperature (trans-membrane temperature difference of 5° C. only) suggesting that mass transfer is governed by the capillary effect.

2. Influence of the Active Layer Thickness on the Membrane Performance

In this example, the active layer has a pore size, porosity and tortuosity of 2 nm, 0.8 and 1.2, respectively, and the support layer has a pore size, porosity, tortuosity and thickness of 1 µm, 0.8, 1.2 and 50 µm, respectively.

Figure 3:
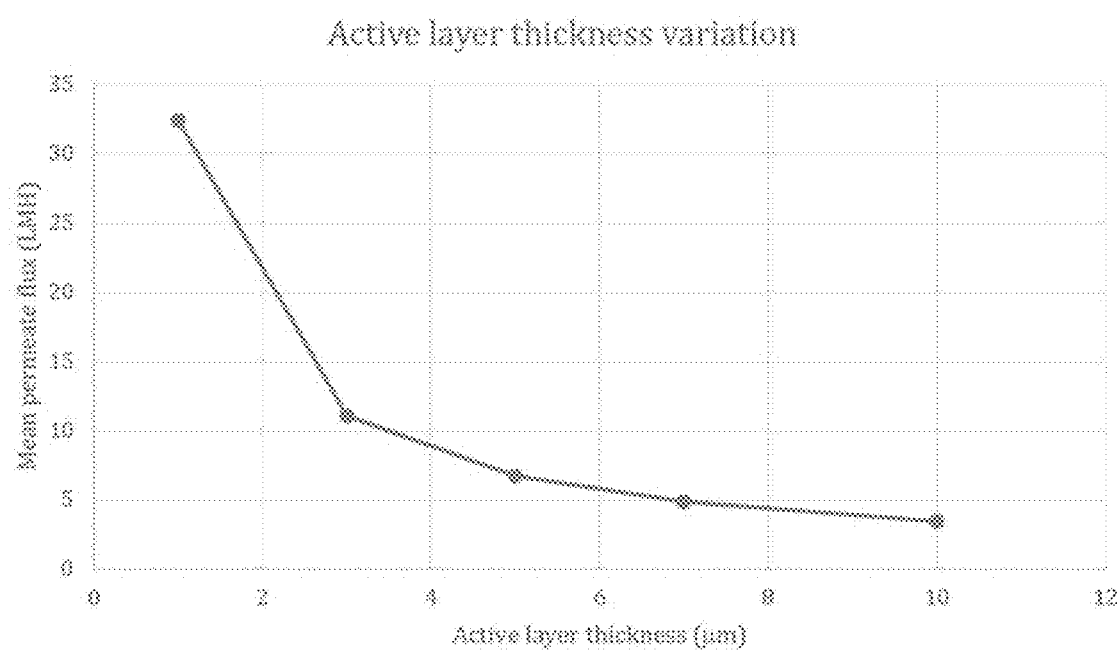
FIG. 3 shows the effect of active layer thickness on the permeate flux at inlet feed and permeate temperatures of 25° C. and 20° C., respectively, and inlet feed and permeate flow rates of 0.4 L/min.

As shown in FIG. 3, the permeate flux decreased significantly with an increase in the active layer thickness from 1 to 3 µm and then further decreased at a slower pace, suggesting that larger thickness of the active layer can make the capillary effect (Kelvin equation) invalid.

Therefore, in a preferred embodiment, the active layer thickness is in the range of about 1 µm.

3. Influence of the Active Layer Contact Angle on the Membrane Performance

In this example, the active layer has a pore size, porosity, tortuosity and thickness of 2 nm, 0.8, 1.2 and 1 µm, respectively, and the support layer has a pore size, porosity, tortuosity and thickness of 1 µm, 0.8, 1.2 and 50 µm, respectively.

Figure 4:
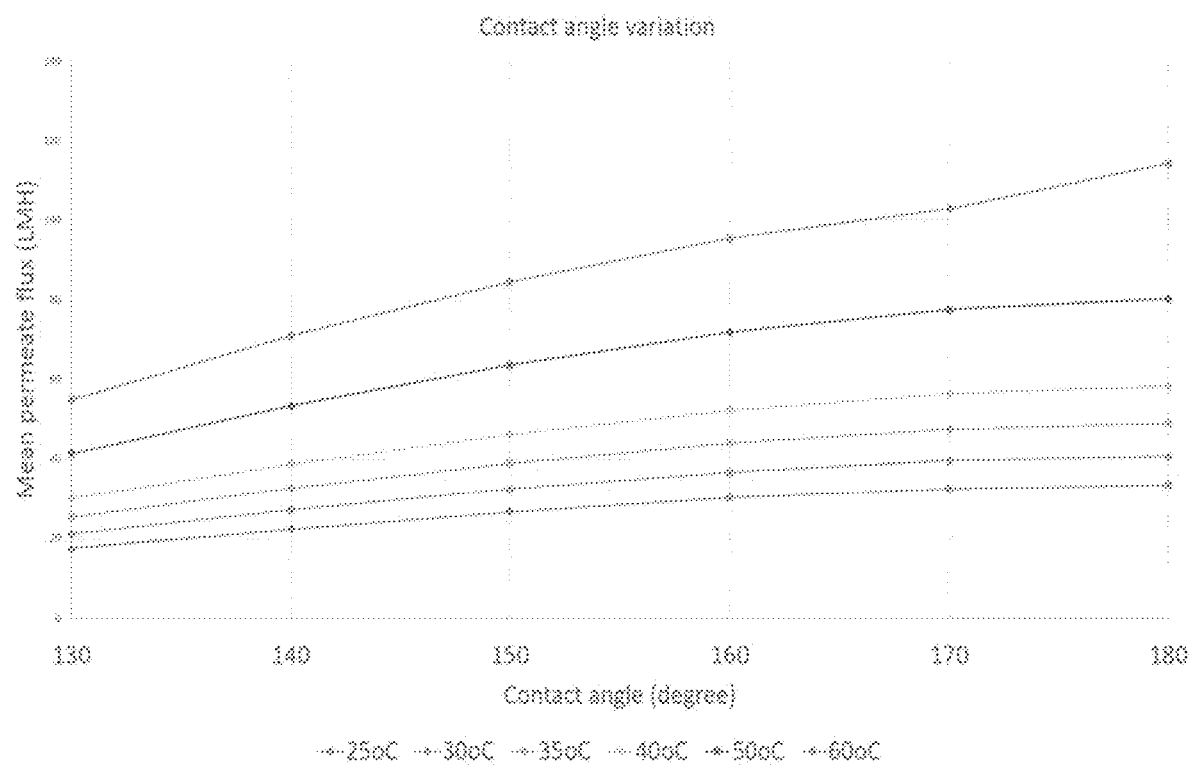
FIG. 4 shows the effect of the active layer contact angle on the permeate flux at various inlet feed temperatures, and an inlet permeate temperature of 20° C., the inlet feed and permeate flow rates are 0.4 L/min.

From FIG. 4, it is observed that the effect of contact angle of the active layer above 130° (facing the feed side) shows only a small increase in permeate flux. As a result, considering the capillary effect, a membrane support layer with a contact angle in the range of at least 130° is sufficient to apply the capillary effect and avoid membrane wetting.

4. Influence of the Active Layer Porosity on the Membrane Performance

In this example, the active layer has a pore size, tortuosity and thickness of 2 nm, 1.2 and 1 µm, respectively, and the support layer has a pore size, porosity, tortuosity and thickness of 1 µm, 0.8, 1.2, 50 µm, respectively.

Figure 5:
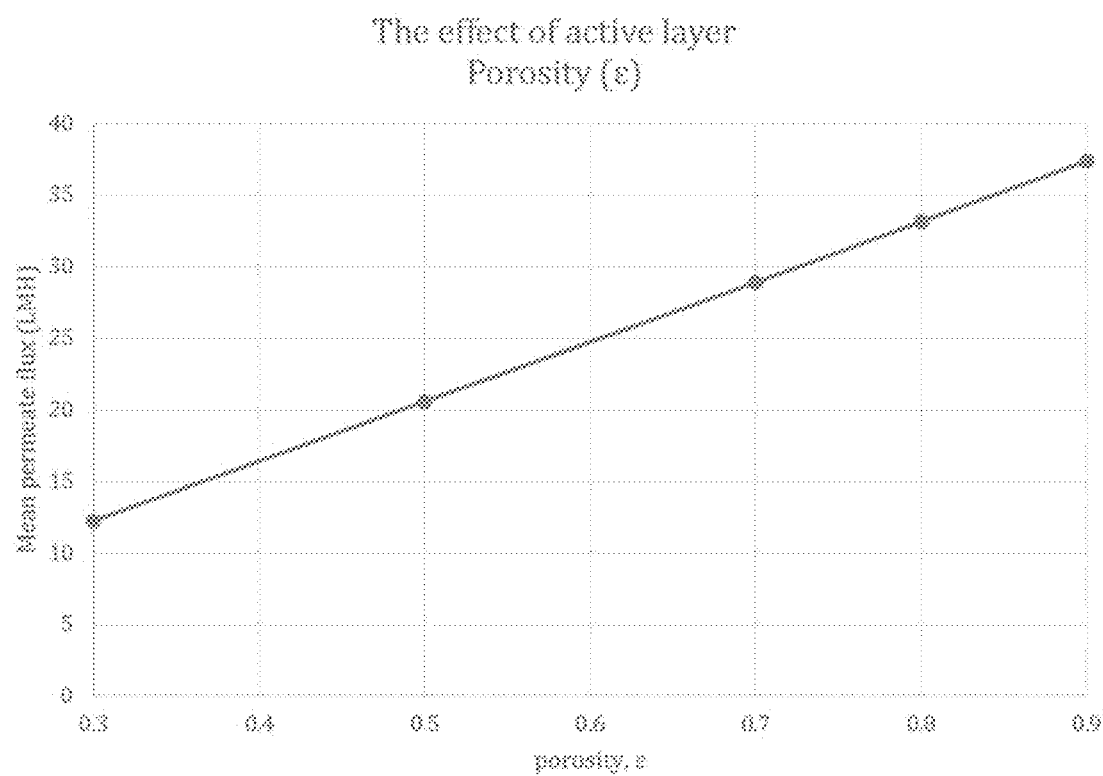
FIG. 5 shows the effect of active layer porosity on the permeate flux at inlet feed and permeate temperatures of 25° C. and 20° C., respectively, and inlet feed and permeate flow rates of 0.4 L/min.

As expected, in the porosity range of 0.3 to 0.9, the permeate flux increased proportionally from approximately 12 to 37 LMH as shown in FIG. 5. This is because the mass transfer coefficient increases proportionally with an increase in the porosity since it follows the Knudsen mass transfer mechanism, as shown in Eq. 10.

5. Influence of Structural Parameters of the Support Layer on the Membrane Performance To study the influence of the support layer characteristics, the active layer pore size, porosity, thickness tortuosity and thickness were fixed at 2 nm, 0.8, 1.2 and 1 µm, respectively, and the support layer pore size is 1 µm.

Figure 6:
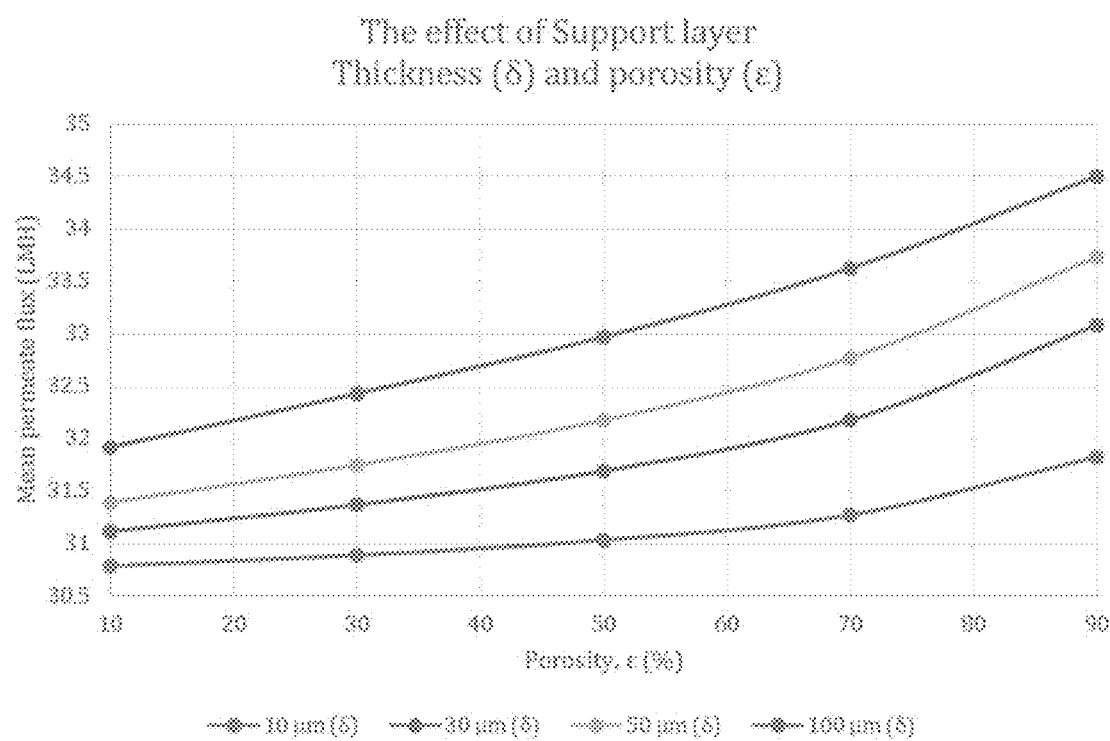
FIG. 6 shows the effect of structural parameters of the support layer on the mean permeate flux at inlet feed and permeate temperatures of 25° C. and 20° C., respectively, and inlet feed and permeate flow rates of 0.4 L/min.

As shown in FIG. 6, it is observed that the permeate flux increased slightly with an increase in the porosity of the support layer. A similar trend was observed by decreasing the support layer thickness. This is because, although a thicker membrane has more mass transfer resistance, it can prevent the heat loss by conduction heat transfer. As shown in FIG. 6, the support layer structure will affect the permeate flux by no more than 5%.

REFERENCES

[1.] M. Qtaishat, T. Matsuura, M. Khayet, K. C. Khulbe, Comparing the desalination performance of SMM blended polyethersulfone to SMM blended polyetherimide membranes by direct contact membrane distillation, Desalination and Water Treatment, 5 (2009) 91-98.

[2.] L. Francis, N. Ghaffour, A. Alsaadi, G. Amy, Material gap membrane distillation: A new design for water vapor flux enhancement, Journal of Membrane Science 448 (2013) 240-247.

[3.] L. Francis, N. Ghaffour, A. Al-Saadi, S. P. Nunes, G. L. Amy, Performance evaluation of the DCMD desalination process under bench scale and large scale module operating conditions, Journal of Membrane Science 455 (2014) 103-112.

The invention claimed is:

1. A composite membrane for use in membrane distillation processes and related applications, the composite membrane comprising:
   a nano-porous super-hydrophobic active layer; and
   a micro-porous hydrophobic support layer,
   wherein the nano-porous super-hydrophobic active layer is provided on the micro-porous hydrophobic support layer.

2. The composite membrane of claim 1, wherein the nano-porous super-hydrophobic active layer has an average pore size in the range of about 0.2 nm to about 10 nm.

3. The composite membrane of claim 1, wherein the nano-porous super-hydrophobic active layer has an average pore size in the range of 0.2 nm to 2 nm.

4. The composite membrane of claim 1, wherein the nano-porous super-hydrophobic active layer has an average pore size of about 0.5 nm.

5. The composite membrane of claim 1, wherein the nano-porous super-hydrophobic active layer has a thickness in the range of 1 µm to 5 µm.

6. The composite membrane of claim 1, wherein the nano-porous super-hydrophobic active layer has a thickness of about 1 µm.

7. The composite membrane of claim 1, wherein the surface of the nano-porous super-hydrophobic active layer has a water contact angle of at least 130°.

8. The composite membrane of claim 1, wherein the surface of the nano-porous super-hydrophobic active layer has a water contact angle in the range of from about 130° to about 180°.

9. The composite membrane of claim 1, wherein the micro-porous hydrophobic support layer has an average pore size ranging from about 0.1 µm to about 5 µm.

10. The composite membrane of claim 1, wherein the micro-porous hydrophobic support layer has an average pore size ranging from about 0.5 µm to about 2 µm.

11. The composite membrane of claim 1, wherein the micro-porous hydrophobic support layer has an average pore size of about 1 µm.

12. The composite membrane of claim 1, wherein the micro-porous hydrophobic support layer has a thickness in the range of about 50 µm to about 100 µm.

13. The composite membrane of claim 1, wherein the micro-porous hydrophobic support layer has a thickness of about 100 µm.

14. The composite membrane of claim 1, wherein the composite membrane is suitable for use in membrane distillation processes under conditions wherein the inlet feed temperature is in the range of about 21° C. to about 40° C.

15. The composite membrane of claim 1, wherein the composite membrane is suitable for use in membrane distillation processes under conditions wherein the inlet feed temperature is at a related ambient feed water temperature in the case of VMD configuration.

16. The composite membrane of claim 1, wherein the composite membrane is suitable for use in membrane distillation processes under conditions wherein the trans-membrane temperature differential between water at the feed side and water at the permeate side is from about 1° C. to about 10° C.

17. The composite membrane of claim 1, wherein the composite membrane is configured to produce high water vapor flux by the capillary effect at a trans-membrane temperature differential of from about 1° C. to about 10° C.

18. The composite membrane of claim 14, wherein the feed inlet temperature is about 21° C. and the permeate temperature is about 20° C.

19. A membrane distillation process, the process comprising:
providing a composite membrane comprising:
a nano-porous super-hydrophobic active layer; and
a micro-porous hydrophobic support layer,
wherein the nano-porous super-hydrophobic active layer is provided on the micro-porous hydrophobic support layer; and
using the composite membrane in the membrane distillation process with a transmembrane differential between about 1° C. to about 10° C.

20. The membrane distillation process of claim 19, wherein the membrane distillation process is direct contact membrane distillation.

21. The membrane distillation process of claim 19, wherein the membrane distillation process is vacuum membrane distillation.

22. The membrane distillation process of claim 19, wherein the membrane distillation process is sweeping gas membrane distillation.

23. The membrane distillation process of claim 19, wherein the membrane distillation process is air gap membrane distillation.

24. The membrane distillation process of claim 19, wherein the membrane distillation process is water/material/conductive gap membrane distillation.

* * * * *